July 11, 1961 J. H. BOICEY 2,991,686
METHOD OF INSPECTING BENT GLASS SHEETS
Filed Oct. 21, 1957

INVENTOR.
James H. Boicey
BY Nobbe & Swope
ATTORNEYS

United States Patent Office 2,991,686
Patented July 11, 1961

2,991,686
METHOD OF INSPECTING BENT GLASS SHEETS
James H. Boicey, Toledo, Ohio, assignor to Libbey-Owens-Ford Glass Company, Toledo, Ohio, a corporation of Ohio
Filed Oct. 21, 1957, Ser. No. 691,203
8 Claims. (Cl. 88—14)

This invention relates broadly to the art of producing bent laminated glass units, and more particularly to a novel and improved method for insuring that a plurality of substantially identically bent glass sheets are used in forming a given laminated unit.

Briefly stated, curved laminated or so-called "safety" glass is produced by bending optically-matched pairs of glass sheets in a heated atmosphere until they have sufficiently softened to conform to the curvature of a mold. Subsequently, the pair of curved sheets have an interlayer of non-brittle thermoplastic material, such as polyvinyl butyral sandwiched therebetween and under the influence of heat and pressure the glass sheets and interlayer are united into a transparent integral structure. As the characteristics of the curvatures to which the sheets are bent become more complicated, the possibility arises that one or the other of the paired sheets will not respond under heat in the same manner as the mating sheet in conforming to the curvature of the mold upon which they are bent. Consequently, non-matching areas in the respective sheets occur which are spaced from one another a distance greater than the thickness of the plastic interlayer and thus cannot form an effective bond therewith and show up as undesirable translucent areas in the finally laminated unit.

It will be readily appreciated that if pairs of glass sheets having non-matching areas therein can be detected prior to being laminated to one another the expense of laminating these defective sheets will be eliminated. However, it is obvious that any proposed methods of detecting such non-matching sheets must be fast, reliable, and above all less expensive than the cost of laminating the sheets together. It is further desirable that in the interest of economy the method of inspection be such that it may be performed wherever the bent sheets are stored to eliminate any transportation costs which would be involved in moving the sheets to designated respective areas.

Therefore, the principal object of the present invention is to provide a novel method of inspecting bent glass sheets for conformity of curvature prior to laminating them together.

Another object of my invention is to provide a method of inspecting bent glass sheets by the temporary substitution of an inspection interlayer which is adapted to indicate areas of non-conformity to the curvature in the sheets.

Another object of the invention is to provide a method of inspecting the matching conformity of curvature in bent glass sheets before laminating the same by interposing a fabric therebetween which has been treated in such a manner as to indicate contact thereof with an adjacent glass sheet.

A further object of the invention is to provide a method of inspecting the matching conformity of curvature in a pair of bent glass sheets which may be readily performed at any convenient location in close proximity to the sheets.

Other objects and advantages of the invention will become more apparent during the course of the following description when taken in connection with the accompanying drawings.

In the drawings, wherein like numerals are employed to designate like parts throughout the same:

Figure 1:
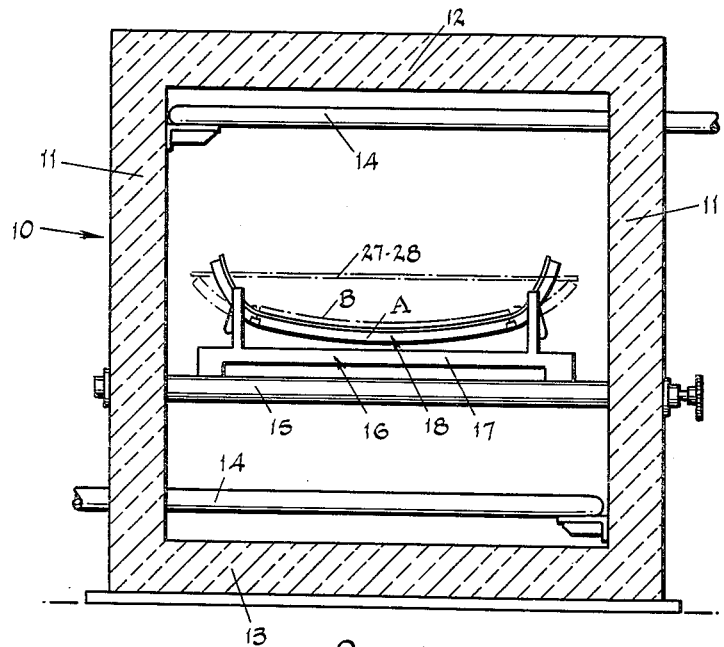
FIG. 1 is a transverse section through a typical bending furnace in which is located a mold for bending glass sheets.

Referring more particularly to the drawing, there is shown in FIG. 1 a cross-sectional view of a conventional bending furnace 10 comprising vertically disposed side walls 11, a roof 12 and floor 13. The furnace may be equipped with any suitable heating means such as the radiant heating tubes 14 that extend transversely of the furnace above and below a conveyor comprising power-driven rolls 15. A glass bending apparatus, generally designated by the numeral 16, is carried by the rolls 15 through zones of increasingly high temperatures in the furnace 10 and thence through an annealing lehr which, though not herein shown, is located at the end of the heating and bending zone of the furnace and as a continuation thereof.

Figure 2:
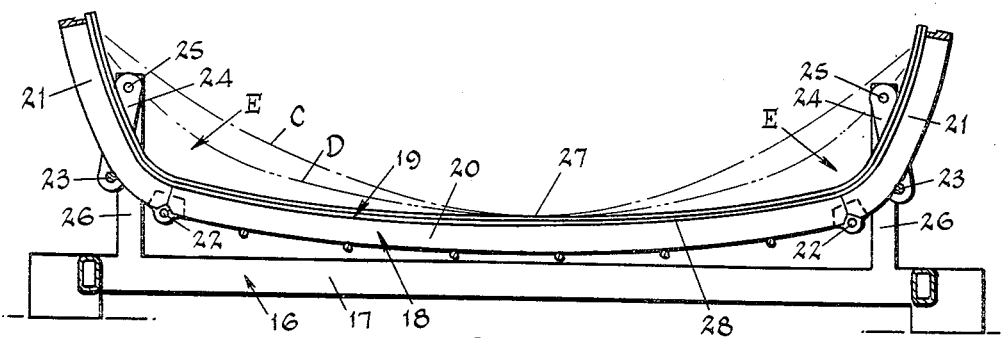
FIG. 2 is an enlarged longitudinal vertical section of the bending mold shown in FIG. 1.

The bending apparatus 16, more clearly shown in FIG. 2, comprises a rack or base 17 on which is carried a mold 18. In accordance with customary bending procedures, matched pairs of flat glass sheets are supported upon the mold and softened by heat until they bend downwardly into conformity with template rail or mold shaping surface indicated by the numeral 19. After the glass bending apparatus 16 leaves the lehr and before the completely bent sheets are removed from the shaping surface 19, a small cross is painted on the outer surfaces of each sheet at each end thereof. Thus when the plastic interlayer is sandwiched between the inner surfaces, the sheets are assured of being placed in their proper juxtaposition by accurately aligning these crosses.

As herein shown, the mold 18 is made up of a central section 20 and end sections 21 arranged in end to end relationship that are cooperatively connected to the central section by hinges 22. The mold is carried by the rack 17 on transversely disposed rods 23 rigidly secured to the end sections 21 and supported at their ends by links 24. The links are swingably supported at their upper ends on pins 25 that are fixed in vertically disposed posts 26 which form parts of the rack 17 and are located in the respective corners thereof.

The end mold sections 21 are adapted to be moved from a closed position A, shown in full lines in FIG. 1, to an open position B indicated in broken line by means of the hinges 22. When in the open position the mold supports one or more flat glass sheets 27 and 28 which are to be bent. As the molds and glass sheets are passed through the furnace, the sheets are heated and upon reaching a temperature somewhat above 1000° F. they enter the bending cycle. In the final zones of the furnace, the bending is accelerated in many instances to cause settling of the sheets upon the mold shaping surfaces. Certain areas of the curvature may be characterized by extremely sharp curves. To illustrate, there is shown by way of example in FIG. 2 a broken line C which hypothetically describes the initial stage of the bending of the softened glass. Broken line D further illustrates in the same manner the condition of the glass sheets in the later stages of their bending. It will be noticed that the ends of the sheets, as well as the centrally disposed area, are supported by the shaping surface of the mold, but the areas generally indicated at E are not in contact with the mold shaping surface.

In order to achieve complete conformity of the glass sheets to the mold, it has been found advantageous to localize a concentrated higher heat source in such specific areas E. This accentuates the bending of the glass and enables the same to settle against the mold without exposing the center and extreme areas to the relatively greater source of heat. However, this concentration of heat in specific areas also increases the possibility of one sheet bending differently from the other thus producing two sheets having non-matching surfaces.

Unless complete nesting or matching of the sheets has been accomplished in the bending operation the plastic interlayer, when softened, will not adhere to every portion of the opposed glass surfaces when the bent sheets are processed through the ultimate laminating operation. This may be caused by insufficient heat absorption by the upper sheet which will prevent the affected areas from settling into either marginal conformity with the mold shaping surface or transverse matching with the opposite sheet. Also in the event that the upper sheet does not receive properly distributed heat from localized sources, the lower sheet may have absorbed heat sufficiently to move downwardly to create a so-called condition of cross or over bending. This may occur in one or both of the end areas of the glass sheets, and it is apparent that other and like circumstances may arise which would cause a great deal of glass intended for laminating to be rejected.

Figure 3:
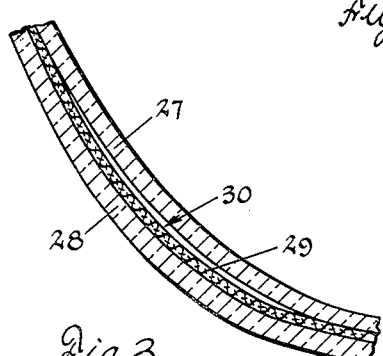
FIG. 3 is an enlarged sectional view of a pair of glass sheets after they have been bent and illustrating an area of non-matching curvature.
Figure 4:
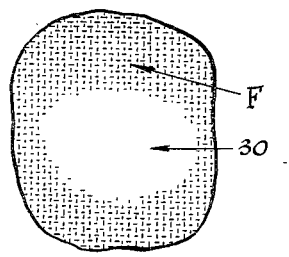
FIG. 4 is a fragmentary plan view of a portion of the pair of sheets shown in FIG. 3.

It has been discovered that such incorrect initial bending can be reduced, if not completely eliminated, by examining the first-run pairs of sheets and then adjusting the general heat pattern of the furnace or such auxiliary and localized heat sources as may be employed. For this purpose, an inspection interlayer, generally indicated at 29 in FIG. 3, is placed between the sheets and the areas of non-conformity will become apparent by a change in the over-all appearance of the glass surface. More particularly, the transmissivity of the glass sheets will be influenced by the inspection interlayer and a general transparent condition in which the individual threads of the interlayer are discernible will be noticed in the event that both sheets nest satisfactorily throughout their surfaces. However, if areas of the surfaces are separated, the inspection interlayer 29 will appear as a thin sheet having no interstices in the non-conforming areas in which the interlayer does not contact one of the glass sheets. This is illustrated in FIG. 4 wherein an area of separation between the uppermost sheet 27 and the lower sheet 28 has been defined as at 30.

In the event that the upper sheet 27 is not sufficiently bent to the proper curvature in the area 30 the inspection interlayer 29 can contact only one sheet in this area. Likewise if the upper sheet 27 is properly bent, but the lower sheet 28 is not properly bent the inspection interlayer 29 will again contact only one sheet in this area. Thus the areas of the inspection interlayer 29 which contact both sheets 27 and 28 will have a different appearance from the areas of the inspection interlayer 29 which contact only one sheet.

The method of inspecting the bent glass sheets embodied in this invention involves interposing between the spaced glass sheets 27 and 28 a sheet of porous material 29 having relatively large interstices. Cloth such as voile, muslin, or cheesecloth have been satisfactorily used. It is also desirable that the material used in the inspection interlayer 29 have the property of tending to cling to glass, and to assist this material in clinging to the glass the inspection interlayer is thoroughly wetted.

In the preferred embodiment of the method of the invention, the uppermost sheet 27 is positioned with its inner matching surface facing upward. A sheet of voile or other porous material having relatively large interstices is thoroughly wetted by immersing it in water. The excess water is then wrung from the voile sheet, and the sheet is laid upon the upward facing surface of the sheet 27. The second sheet 28 is then placed over the sheet 27 which is supporting the inspection interlayer 29, and the mating surface of sheet 28 contacts the opposite side of the inspection interlayer 29. The previously mentioned crosses which have been painted on the outer surfaces of the sheets are then aligned to insure proper positioning of the sheets.

It is apparent that the mating surface of the bent glass sheets 28 and 29 will contact both sides of the inspection interlayer 29 in areas of matching conformity. This will produce the visible effect as indicated at F in FIG. 4 wherein the individual threads of the interlayer are readily seen and the relatively large interstices between the threads are likewise identifiable. However, in areas of non-conforming curvature the inspection interlayers will contact only one surface of the glass sheets as illustrated in FIG. 3, and the inspection interlayer 29 will appear as a sheet having no interstices in such non-matching areas 30 as shown in FIG. 4 wherein the individual threads are not readily definable and the interlayer has a substantially uniform appearance.

The relation of such areas 30 to the mold surface is then noted and the heat sources in the bending furnace can be adjusted to localize the required heat in and along the path of the bending apparatus to act properly on the desired areas of the sheets. Also, if desired, the conformity of the sheets may be inspected by placing the inspection interlayer 29 in contact with the lower sheet 28, and then placing the uppermost sheet 27 in contact with the opposite side of this interlayer.

It is to be understood that the form of the invention herewith shown and described is to be taken as a preferred embodiment of the same, but that various modifications may be resorted to without departing from the spirit of the invention or the scope of the subjoined claims.

I claim:

1. A method of inspecting the matching conformity of the mating surfaces of a pair of curved glass sheets which are to be subsequently laminated, comprising interposing between spaced glass sheets to be inspected a wetted textile material having relatively large interstices, then bringing the sheets into contact with opposed surfaces of said material whereby the material will not simultaneously contact both mating surfaces of the sheets in areas of non-conformity and the portion of the material not contacting both surfaces appears as a sheet having no interstices while the individual threads of the portion of the material contacting both surfaces are readily discernible.

2. A method as claimed in claim 1, wherein a wetted voile inspection interlayer is interposed between the spaced glass sheets to be inspected.

3. A method as claimed in claim 1, wherein a wetted muslin inspection interlayer is interposed between the spaced glass sheets to be inspected.

4. A method as claimed in claim 1, wherein a wetted cheesecloth interlayer is interposed between the spaced glass sheets to be inspected.

5. A method of inspecting the matching conformity of the mating surfaces of a pair of curved glass sheets which are to be subsequently laminated, comprising the steps of contacting the surface to be inspected of one of the curved glass sheets with one surface of a wetted sheet of porous textile material having relatively large interstices, contacting the opposite surface of the sheet of wetted porous textile material with the surface to be inspected of the other curved glass sheet whereby the sheet of wetted porous textile material will contact the mating surfaces of the curved glass sheets only in areas of matching conformity and the individual threads of the wetted porous textile material will be readily discernible in these areas while the individual threads will not be readily discernible in the areas of non-conformity.

6. A method as claimed in claim 5, wherein one surface of a wetted voile sheet is placed in contact with the surface to be inspected.

7. A method as claimed in claim 5, wherein one surface of a wetted muslin sheet is placed in contact with the surface to be inspected.

8. A method as claimed in claim 5, wherein one surface of a wetted cheesecloth sheet is placed in contact with the surface to be inspected.

References Cited in the file of this patent

UNITED STATES PATENTS

| | | |
|---|---|---|
| 1,931,477 | Allen | Oct. 24, 1933 |
| 1,988,964 | Barrows | Jan. 22, 1935 |